INVENTORS
F.T.Warmington & L.Rupert
BY
THEIR ATTORNEY

Patented Nov. 1, 1938

2,134,962

UNITED STATES PATENT OFFICE 2,134,962

TRACK CIRCUIT FOR RAILROADS

Floyd T. Warmington and Louis Rupert, Detroit, Mich., assignors to General Railway Signal Company, Rochester, N. Y.

Application August 27, 1934, Serial No. 741,615

1 Claim. (Cl. 246—41)

This invention relates to track circuits for railroads, and more particularly to means for regulating the voltage supplied to a direct current track circuit to compensate for variations in ballast resistance.

In the usual and well-known track circuit, with a given supply of voltage at the feed end, the current supplied to the track relay depends upon the ballast resistance; and if an adjustment of the supply of voltage is made to provide sufficient operating current for the relay under wet conditions of the ballast and high ballast leakage, there is excess current through the relay under dry ballast conditions and low ballast leakage, which tends to interfere with the proper shunting of the track relay.

Generally speaking, in accordance with this invention, it is proposed to provide a source of uni-directional voltage for a track circuit which is automatically varied in accordance with changes in ballast conditions for the purpose of maintaining the current through the track relay substantially constant and render its shunting more reliable.

Figure 1:
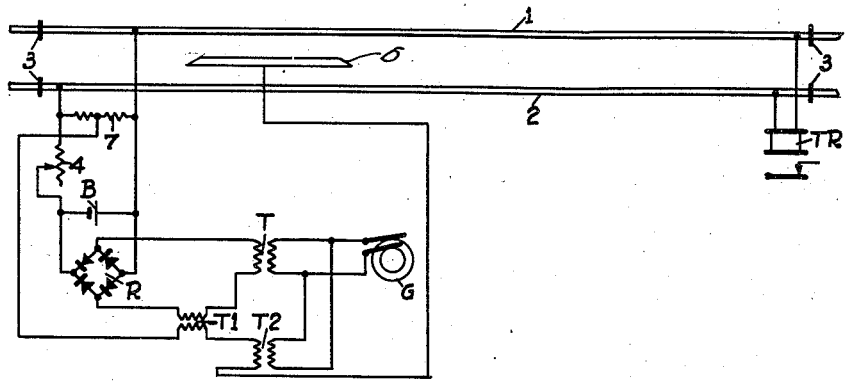
Figure 2:
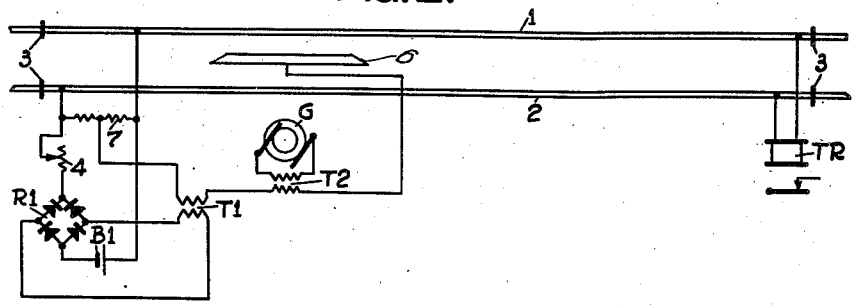
Figure 3:
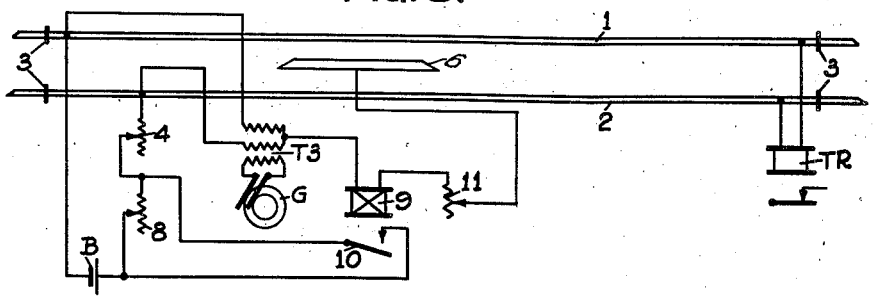

The drawing illustrates in a diagrammatic and simplified manner different specific embodiments of the invention. Fig. 1 shows one form of the invention particularly applicable to the use of storage batteries; Fig. 2 shows a modification suitable for primary batteries; and Fig. 3 shows a modification in the manner in which the current supplied by the track battery is varied.

The invention contemplates the usual and well-known arrangement for a track circuit, in which the track rails 1 and 2 are bonded in the usual way, with insulated joints 3 defining the ends of the track section, and with a track relay TR of the usual type and construction connected across the track rails 1 and 2 at one end of the track section. The present invention relates more particularly to the supply of current at the feed end of the track section.

Referring to Fig. 1, the track battery B, assumed to be in the form of a storage battery, is connected across the track rails 1 and 2 in series with an adjustable limiting resistance 4 in the usual way. The output circuit of a double-wave rectifier R of the usual type and construction, preferably of the dry-plate or copper-oxide type, is connected across the battery B; and the input circuit of this rectifier includes the secondaries of two transformers T and T1. The primary of transformer T is supplied with alternating current from a suitable transmission line connected to an alternating current generator G. The primary of the transformer T1 is connected in a ground or ballast resistance detecting circuit which includes the secondary of a transformer T2, having its primary connected to the alternating current supply. One end of this ground circuit is connected to a suitable ground 6, and the other end to the mid-point of a resistance 7 across the battery leads or directly across the rails. The ground 6 is preferably associated with the ballast for the track, and is in the form of a plate, rail, or the like buried in the ballast, and having sufficient area to provide a resistance to ground commensurate with the ballast resistance of the track circuit. The resistance 7 is relatively high so as not to interfere materially with the supply of the current from battery B to the track circuit.

In this arrangement of Fig. 1, the current supplied to the track circuit is derived from the battery B and the rectifier R. The current supplied to the rectifier R depends upon the substantially fixed voltage of the transformer T and the variable current in the secondary of the transformer T1. The current in the primary of the transformer T1 in turn depends upon the substantially fixed voltage of the transformer T2 and the resistance of the ballast as indicated by the resistance between the ground 6, resistance 7, and resistance of the track rails 1 and 2 to ground.

Thus, as the ballast becomes wet and the ballast leakage increases to reduce the current supplied to the track relay TR, more current flows in the ballast resistance detecting circuit, thereby supplying more current from the secondary of the transformer T1 to the rectifier R to increase the current fed to the track circuit. Conversely, as the ballast dries out, less current is supplied to the track circuit from the rectifier R. In this way, the supply of current to the track circuit is automatically regulated, within limits, in accordance with variations in the ballast resistance, so as to maintain the current through the track relay TR substantially constant, and render it responsive to a substantially same wheel shunt under various ballast conditions.

Referring to Fig. 2, the track battery B1 is connected to the track rails 1 and 2 in series with the output circuit of the rectifier R1, and the limiting resistance 4. The input circuit of the rectifier R1 is connected to the secondary of the transformer T1, having its primary in a ballast resistance detecting circuit energized by a transformer T2 and terminating in a ground 6 and resistance 7 connected to the track rails. In this arrangement, as the current in the ground circuit increases due to lowered ballast resistance, the current supplied to the rectifier R1 is increased, and this increases the current supplied to the track circuit to compensate for the greater loss of current by ballast leakage.

Referring to the modification of Fig. 3, the track battery B is connected across the track rails 1 and 2 in series with an adjustable resistance 8, in addition to the usual adjustable limiting resistance 4. A relay 9, responsive to alternating current, establishes a short circuit through its front contact 10 around the resistance 8. The energizing circuit for the relay 9, terminating at one end of the ground 6, includes an adjustable reactance or resistance 11 and is connected at its other end to terminals of corresponding potential of two secondaries of a transformer T3, the other terminals of said secondaries being connected across the track rails 1 and 2, and the primary of this transformer being supplied with alternating current from a suitable source G. The resistance of the secondary of the transformer T3 is relatively high, so as not to interfere with the operation of the track circuit.

In this arrangement of Fig. 3, when the ballast becomes wet, and its resistance falls below some critical value rendering the response of the track relay TR uncertain, relay 9 is sufficiently energized to close its front contact 10 and short circuit the resistance 8, so that the inter-rail voltage in the feed end of the track circuit is increased to supply sufficient current for the relay TR. In this arrangement of Fig. 3, the adjustment of the feed voltage is made in steps, rather than gradually as the arrangements of Figs. 1 and 2; but such single step adjustment is adequate for certain types of track circuits having a limited range of ballast resistance variation.

This invention is characterized by the provision of a ground circuit detecting or indicating variations in the ballast resistance or leakage of the track circuit, and variations in the current in this ground circuit act to change the current supplied to the track circuit so as to compensate for the change in ballast conditions. The specific organization and arrangement of means shown and described for performing the desired functions are merely illustrative; and various modifications and adaptations may be made without departing from the invention.

What we claim is:—

A track circuit comprising a battery, a transformer with two equal independent secondaries so connected to the rails and through an electro-responsive device to ground that there is no difference in alternating current potential between the rails and equal alternating current potential from each rail to ground, and means governed by said device for varying the voltage applied from the battery to the track circuit to conform with variations in ballast resistance.

FLOYD T. WARMINGTON.
LOUIS RUPERT.